US012776148B2

(12) United States Patent
Song et al.

(10) Patent No.: US 12,776,148 B2
(45) Date of Patent: Oct. 27, 2026

(54) REAL-TIME VESSEL IDENTITY AND IMAGE MATCHING DISPLAY METHOD THEREOF

(71) Applicant: SHIP AND OCEAN INDUSTRIES R&D CENTER, New Taipei City (TW)

(72) Inventors: Yan-Sheng Song, Kaohsiung City (TW); Chien-Hung Liu, Kaohsiung City (TW); Yu-Ting Peng, Kaohsiung City (TW)

(73) Assignee: SHIP AND OCEAN INDUSTRIES R&D CENTER, New Taipei City (TW)

( * ) Notice: Subject to any disclaimer, the term of this patent is extended or adjusted under 35 U.S.C. 154(b) by 0 days.

(21) Appl. No.: 19/215,227

(22) Filed: May 21, 2025

(65) Prior Publication Data

US 2026/0162441 A1 Jun. 11, 2026

(30) Foreign Application Priority Data

Dec. 5, 2024 (TW) ................................ 113147157

(51) Int. Cl.
*G06V 20/58* (2022.01)
*B63B 49/00* (2006.01)
(Continued)

(52) U.S. Cl.
CPC .............. *G06V 20/58* (2022.01); *B63B 49/00* (2013.01); *G01C 21/203* (2013.01); (Continued)

(58) Field of Classification Search
CPC .. G06V 20/58; G06V 10/751; G06V 2201/08; B63B 49/00; B63B 2213/00; G01C 21/203
See application file for complete search history.

(56) References Cited

U.S. PATENT DOCUMENTS 12,056,182 B2 8/2024 Chang et al.
2022/0130145 A1* 4/2022 Connary .............. G05D 1/0016
(Continued)

FOREIGN PATENT DOCUMENTS

CN 104535066 A 4/2015
CN 114092372 A 2/2022
(Continued)

*Primary Examiner* — Richard T Torrente
(74) *Attorney, Agent, or Firm* — Cheng-Ju Chiang

(57) ABSTRACT

The invention discloses a real-time vessel identity and image matching display method. The step of (A) is providing a real-time vessel identity and image matching system. The step of (B) is a calculating unit using a nautical data, each of identity information and first image to calculate and to obtain analysis data. The step of (C) is the calculating unit filtering the analysis data via a block filtering condition to obtain second image. The step of (D) is the calculating unit displaying the identity information of at least one object on the second image and adjusting the display position of the identity information of each of the at least one object via a position adjustment condition to obtain third image. The step of (E) is calculating unit sending the third image to a display device. The step of (F) is display device displaying the third image.

19 Claims, 10 Drawing Sheets

(51) Int. Cl.
*G01C 21/20* (2006.01)
*G06V 10/75* (2022.01)

(52) U.S. Cl.
CPC ........ *G06V 10/751* (2022.01); *B63B 2213/00* (2013.01); *G06V 2201/08* (2022.01)

(56) References Cited

U.S. PATENT DOCUMENTS

| | | | | |
|---|---|---|---|---|
| 2022/0391621 | A1* | 12/2022 | Chen | G06T 7/20 |
| 2024/0371168 | A1* | 11/2024 | Dixit | G06V 20/56 |
| 2024/0395007 | A1* | 11/2024 | Ravi Kumar | G06V 10/26 |
| 2025/0037467 | A1* | 1/2025 | Lu | G06V 20/49 |
| 2025/0384694 | A1* | 12/2025 | Sakthi | G06V 20/56 |
| 2026/0097763 | A1* | 4/2026 | Tsuchiya | B60W 30/12 |
| 2026/0116403 | A1* | 4/2026 | Oza | B60W 50/0225 |

FOREIGN PATENT DOCUMENTS

| | | | |
|---|---|---|---|
| JP | 2003-279641 | A | 10/2003 |
| TW | 202414247 | A | 4/2024 |

* cited by examiner

REAL-TIME VESSEL IDENTITY AND IMAGE MATCHING DISPLAY METHOD THEREOF

TECHNICAL FIELD

The present invention relates to a real-time vessel identity and image matching display method, especially for filtering obstruction and optimizing the display position in real time.

BACKGROUND OF RELATED ARTS

When a ship is sailing on the sea, there will be multiple ships sailing on the surrounding sea simultaneously. At this time, the captain can determine the sailing direction and speed of other ships based on the signal of Automatic Identification System, and adjust the sailing direction and speed of own ship, dodging other ships in the same sea area.

The signal of Automatic Identification System of ship is fused with an image of the sailing direction of ship. The terrain of the sea area where the vessel is located or other large vessel nearby may affect the fusion fused by signal of Automatic Identification System and image. It causes the signal information of Automatic Identification System being incomplete or overlapping on the screen, and the captain is unable to obtain comprehensive information about the other ships on the sea area.

SUMMARY

Therefore, the purpose of the present invention is to provide the real-time vessel identity and image matching display method.

That is, the real-time vessel identity and image matching display method of the present invention includes the following steps. First, the step (A) is providing a real-time vessel identity and image matching display system. The real-time vessel identity and image matching display system includes a calculating unit, a nautical instrument, an Automatic Identification System (AIS), an image capture device and a display device.

The nautical instrument connects to the calculating unit. The nautical instrument provides a nautical data. The Automatic Identification System connects to the calculating unit, and the Automatic Identification System provides identity information for each of at least one object. The image capture device connects to the calculating unit, and the image capture device provides a first image. The display device connects to the calculating unit.

Further, the step (B) is the calculating unit using the nautical data, each of the identity information and the first image to calculate and to obtain analysis data. The step (C) is the calculating unit filtering the analysis data via a block filtering condition to obtain second image. After that, the step (D) is the calculating unit displaying the identity information of the at least one object on the second image and adjusting the display position of the identity information of each of the at least one object via a position adjustment condition to obtain a third image.

Finally, the step (E) is the calculating unit sending the third image to a display device. The step (F) is the display device displaying the third image.

Certain embodiments implemented under the concept of the present invention may be practiced in automatic recognition system and image fusion technology. By adding filtering obstruction and position adjustment technology, the clarity and accuracy of the display device interface is maintained, and further ensure that the captain can understand the situation of the surrounding sea.

DETAILED DESCRIPTION OF THE INVENTION

In order to understand the technical features and practical efficacy of the present invention and to implement the technical features and practical efficacy in accordance with the contents of the specification, hereinafter, preferred embodiments of the present invention will be described in detail with reference to the accompanying drawings.

Figure 1:
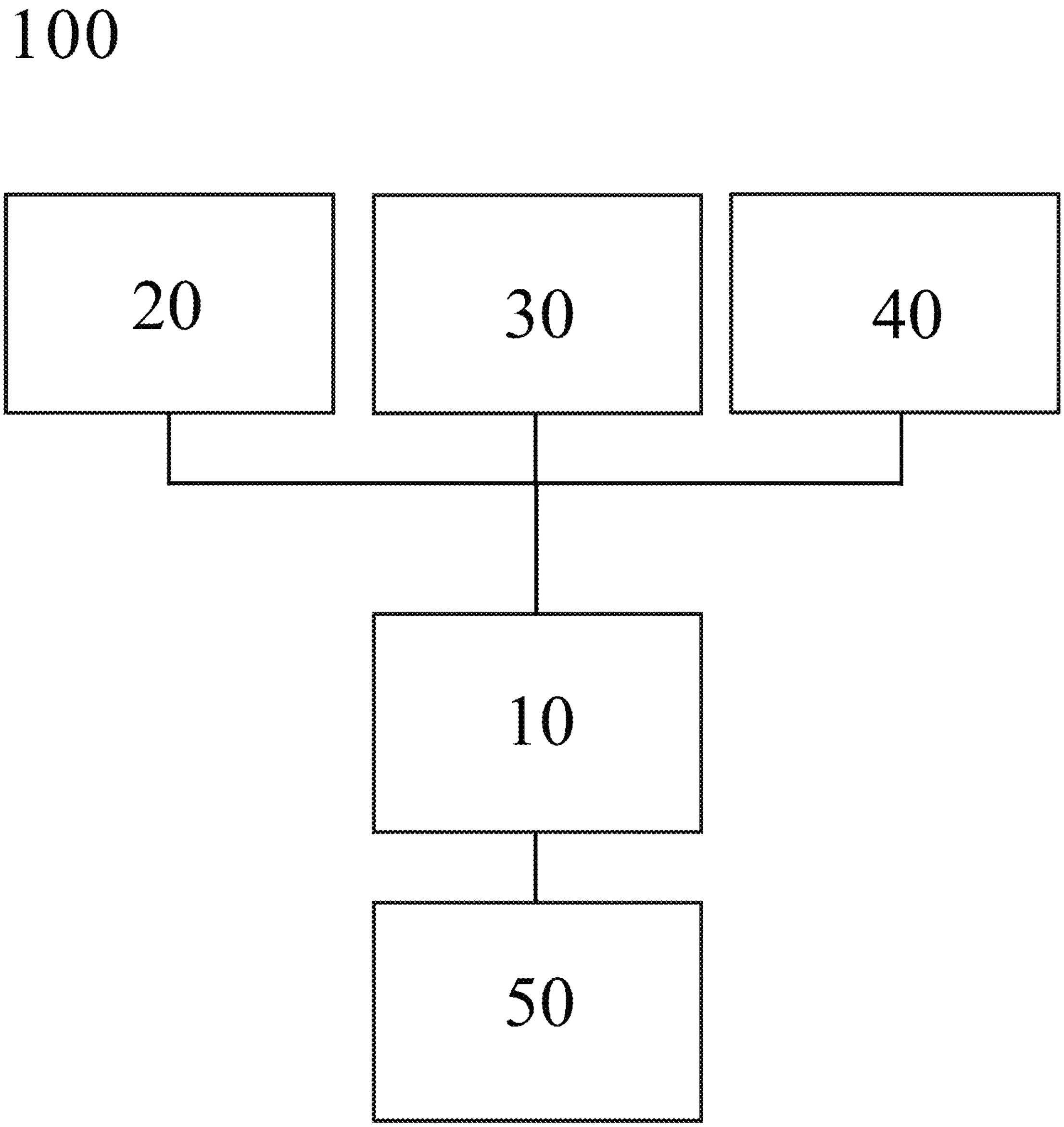
FIG. 1 shows a framework diagram of the real-time vessel identity and image matching display method of the embodiment of the present invention.

Please refer to FIG. 1, the real-time vessel identity and image matching display system 100 of one embodiment of the present invention includes a calculating unit 10, a nautical instrument 20, an Automatic Identification System (AIS) 30, an image capture device 40 and a display device 50. The real-time vessel identity and image matching display system 100 of the present embodiment is configured on a water surface vehicle. The water surface vehicle is a powered vehicle on the water surface.

The calculating unit 10 of the present embodiment is Central Processing Unit (CPU), Graphic Processing Unit (GPU) or the combination thereof.

The nautical instrument 20 connects to the calculating unit 10. The nautical instrument 20 provides a nautical data. The nautical instrument 20 of the present embodiment is nautical chart, compass, radar, Inertial Measurement Unit (IMU) or the combination thereof. The nautical chart includes terrain 70, navigation mark, water depth and radio navigation station, etc. The terrain 70 includes nature terrain 70 and human-made structure. The nature terrain 70 includes island, rock, mountain, shoreline or the combination thereof. The human-made structure includes dock, building or the combination thereof. The compass can interpret direction and provide current heading direction of the water surface vehicle. Specifically, the nautical data includes Global Positioning System (GPS) coordinate of the water surface vehicle, speed of the water surface vehicle, heading direction of the water surface vehicle or the combination thereof.

The Automatic Identification System (AIS) 30 connects to the calculating unit 10. The Automatic Identification System (AIS) 30 provides identity information 61 of the at least one object 60. The at least one object 60 is water vehicle, the water vehicle is defined as various types of vessels with power on the sea. The signal of the Automatic Identification System (AIS) 30 of the present embodiment includes Global Positioning System (GPS) coordinate, ship kind, Maritime Mobile Service Identify (MMSI), ship name, ship speed, heading direction or the combination thereof. The identity information 61 of the at least one object 60 of the present embodiment includes ship name of the at least one object 60, ship speed of the at least one object 60, heading direction of the at least one object 60, Global Positioning System (GPS) coordinate of the at least one object 60, Maritime Mobile Service Identify (MMSI) of the at least one object 60 or the combination thereof.

The image capture device 40 connects to the calculating unit 10. The image capture device 40 provides a first image 401. The image capture device 40 is visible light camera or invisible light camera. The image capture device 40 is configured on bow of the water surface vehicle, and the image capture device 40 captures image of the sea area around the current heading direction of the water surface vehicle in the present embodiment.

The display device 50 connects to the calculating unit 10. The display device 50 is screen or image display.

Figure 2:
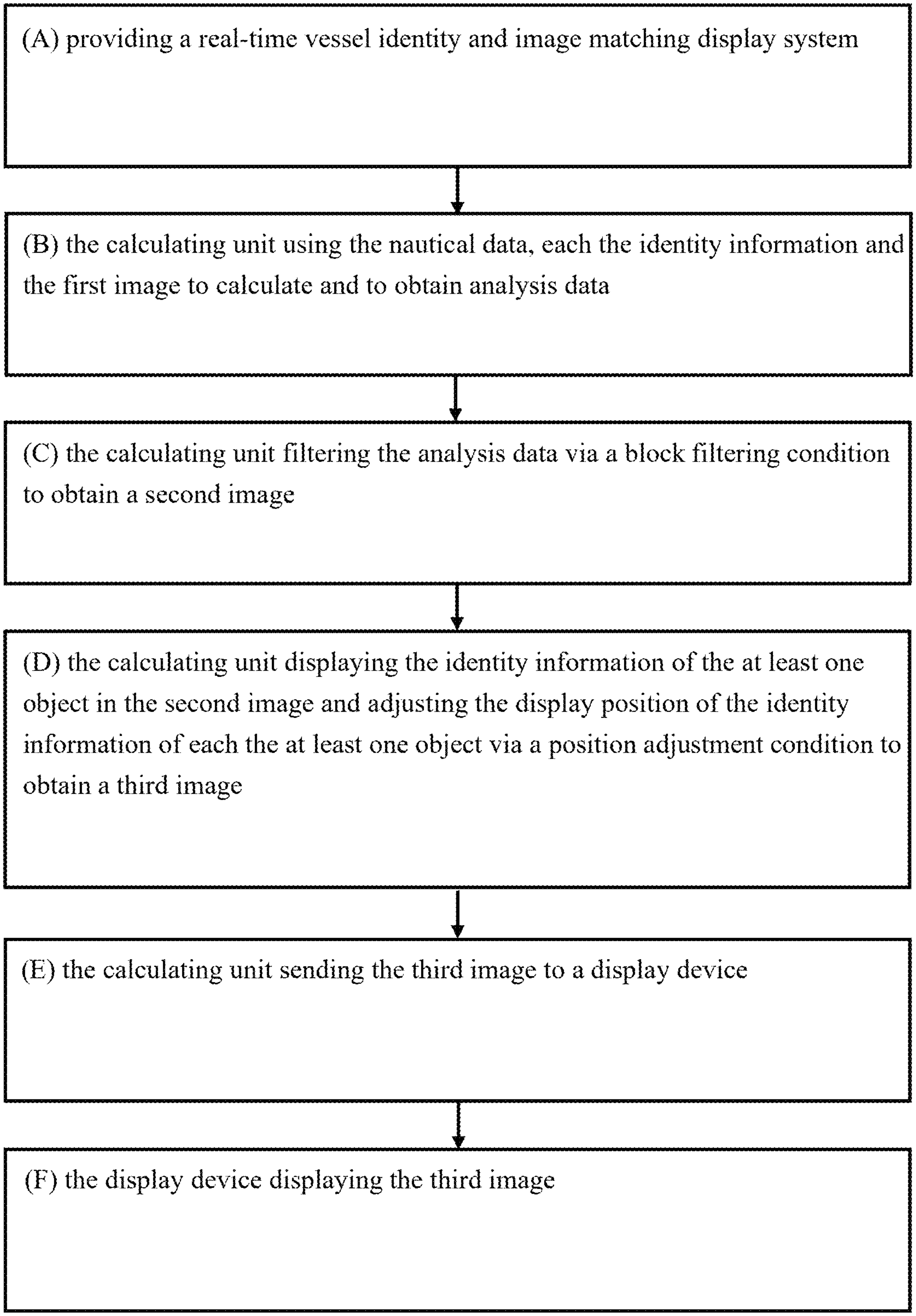
FIG. 2 illustrates a flow chart of the real-time vessel identity and image matching display method of the embodiment of the present invention.

Please refer to FIG. 2, the present embodiment is the real-time vessel identity and image matching display method. The step (A) is providing the real-time vessel identity and image matching display system 100. The real-time vessel identity and image matching display system 100 includes the calculating unit 10, the nautical instrument 20, the Automatic Identification System (AIS) 30, the image capture device 40 and the display device 50. The real-time vessel identity and image matching display system 100 is configured on the water surface vehicle.

The step (B) is the calculating unit 10 using the nautical data, each of the identity information 61 and the first image 401 to calculate and to obtain analysis data. The calculating unit 10 of the present embodiment uses the nautical data, Global Positioning System (GPS) coordinate of the water surface vehicle, speed of the water surface vehicle, heading direction of the water surface vehicle, each of the identity information 61 and the first image 401 of the image capture device 40 to calculate and to obtain analysis data. In this embodiment, the at least one object 60 is displayed as an icon in the first image 401. The first image 401 of the present embodiment is generated from the image capture device 40 which is configured on bow of the water surface vehicle capturing image of the sea area around the current heading direction of the water surface vehicle.

Figure 3:
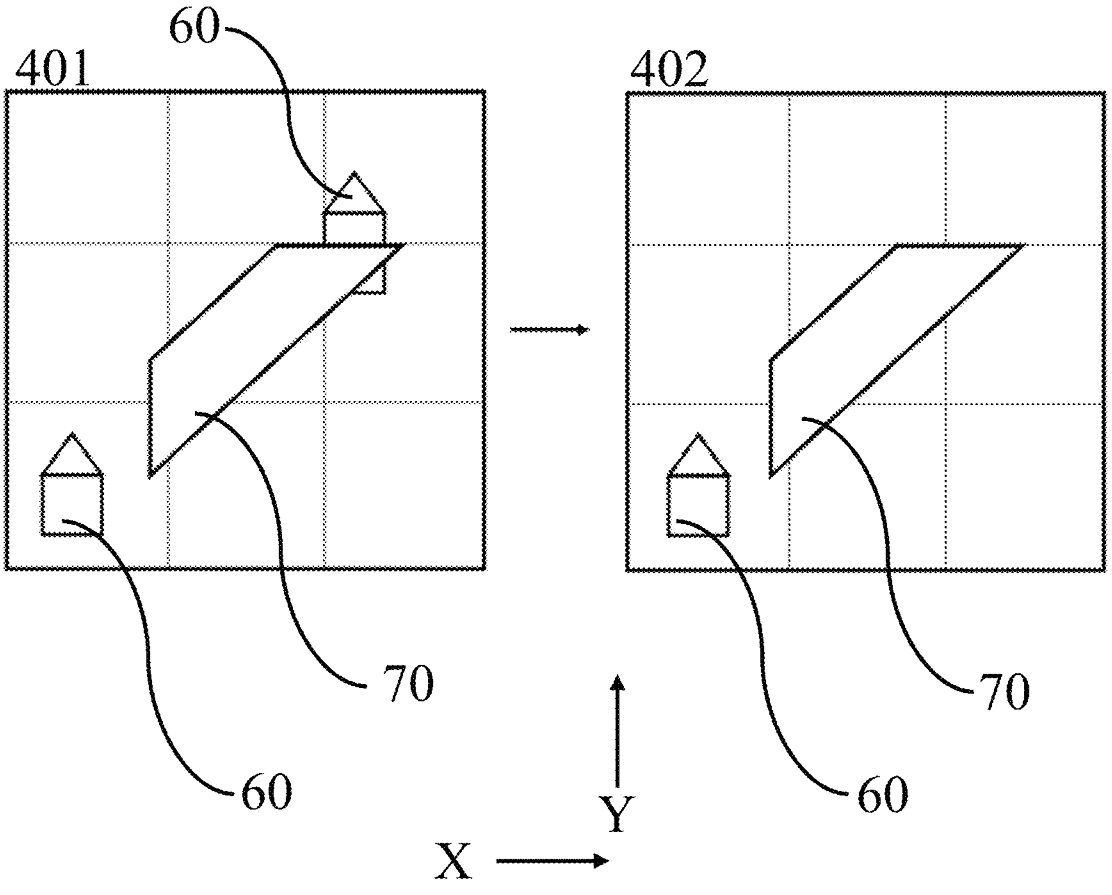
FIG. 3 shows a schematic diagram of the calculating unit filtering the identity information of the at least one object which is blocked by the terrain of the real-time vessel identity and image matching display method of the embodiment of the present invention.

The step (C) is the calculating unit 10 filtering the analysis data via a block filtering condition to obtain a second image 402. The step (C) includes the step (C1) and the step (C2). The step (C1) is the calculating unit 10 using the analysis data to perform image recognition, and the calculating unit 10 identifying the at least one object 60 which is blocked by the terrain 70. Specifically, the terrain 70 is nature terrain 70 or human-made structure. When the at least one object 60 is blocked by the terrain 70, the terrain 70 causes visual obstruction to the at least one object 60. Please refer to FIG. 3, the step (C2) is the calculating unit 10 filtering the identity information 61 of the at least one object 60 which is blocked by the terrain 70. The at least one object 60 is blocked by the terrain 70 in the first image 401. Therefore, the calculating unit 10 filters the identity information 61 of the at least one object 60 due to the at least one object 60 is blocked by the terrain 70. The at least one object 60 is displayed as the icon in the second image 402.

Figure 4:
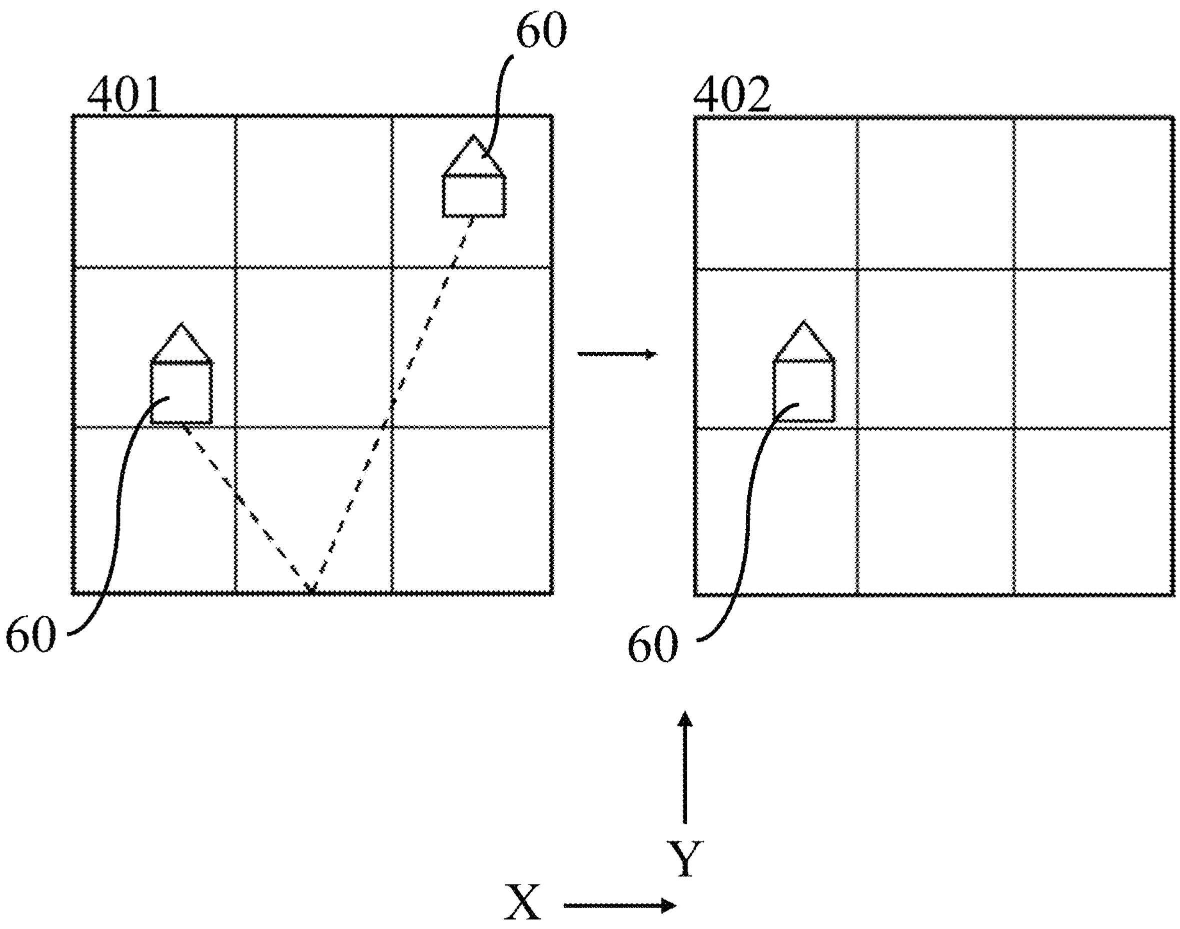
FIG. 4 shows a schematic diagram of the calculating units filtering the identity information of the at least one object when the distance between the water surface vehicle and the at least one object is greater than a first threshold of the real-time vessel identity and image matching display method of the embodiment of the present invention.

Please refer to FIG. 4, the step (C3) is the calculating unit 10 using the analysis data to calculate a distance between the water surface vehicle and the at least one object 60. In this embodiment, the image capture device 40 is taken as origin, and a dashed line indicates the distance between the water surface vehicle and the at least one object 60 in FIG. 4. The step (C4) is the calculating unit 10 filtering the identity information 61 of the at least one object 60 when the distance between the water surface vehicle and the at least one object 60 is greater than a first threshold. In this embodiment, the first threshold for the water surface vehicle which is outside of port is 1 nautical mile. Therefore, when the distance between the water surface vehicle and the at least one object 60 is greater than 1 nautical mile, the calculating unit 10 filters the identity information 61 of the at least one object 60 in the second image 402. In other embodiment, the first threshold for the water surface vehicle which is inside of port is 0.5 nautical mile.

Figure 5:
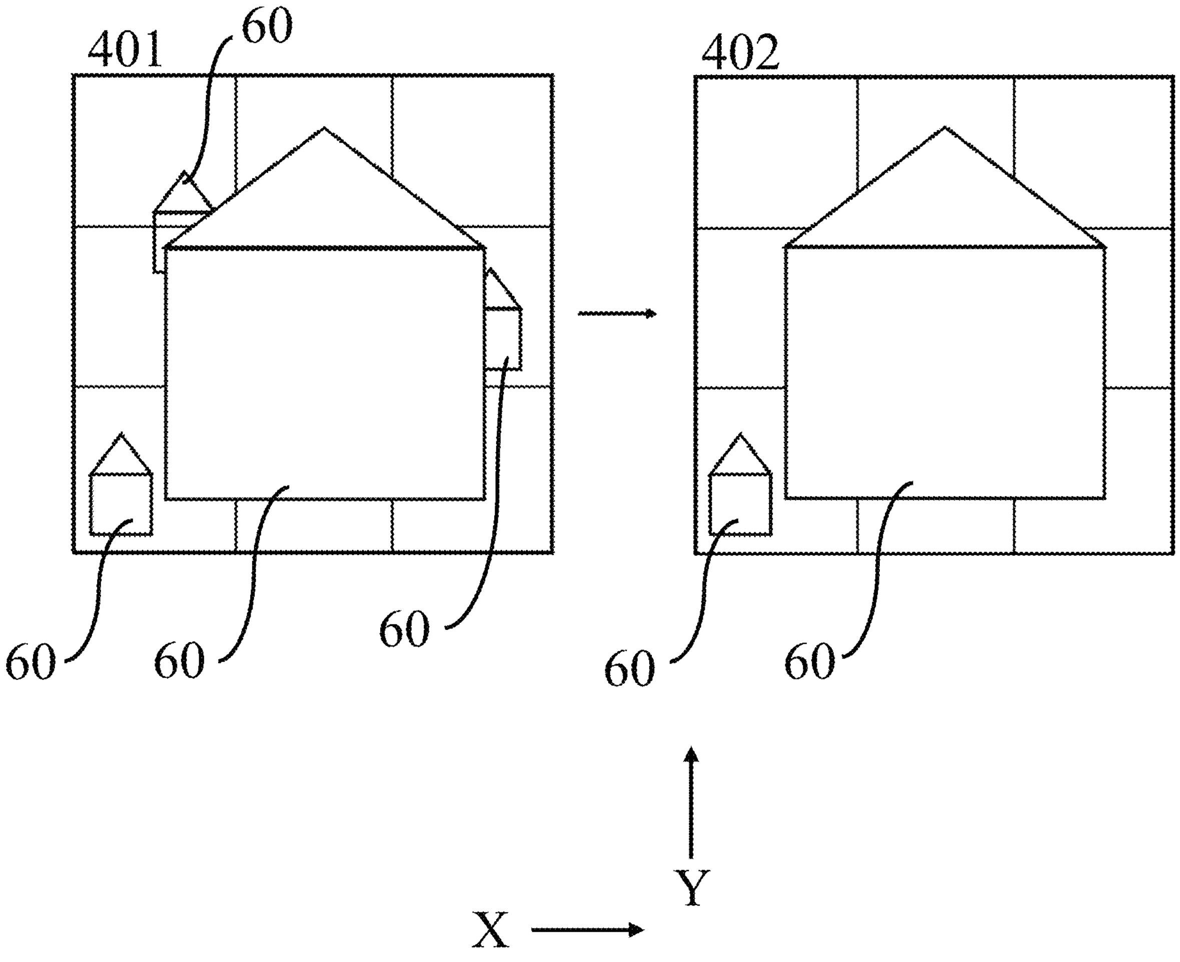
FIG. 5 shows a schematic diagram of the calculating unit filtering the identity information of the at least one object which is blocked when the blocking area ratio is greater than a second threshold of the real-time vessel identity and image matching display method of the embodiment of the present invention.

Further, please refer to FIG. 5. The step (C5) is the calculating unit 10 using the analysis data to calculate an area ratio of the at least one object 60 to the first image 401. The step (C6) is the calculating unit 10 filtering the identity information 61 of the at least one object 60 which is blocked when the area ratio is greater than a second threshold. The second threshold is 75 percent. Specifically, the water surface vehicle of the present embodiment is a small ship, and the at least one object 60 of the present embodiment includes a large object 60 and at least one other object 60. In the present embodiment, the category of ships is defined as a small ship and large object. The small ship includes Fishing, Local vessel, etc. The large object includes ferryboat, etc. When the large object 60 passes near the water surface vehicle, the large object 60 with large volume blocks the at least one other object 60 in the first image 401. Therefore, when the area ratio of the large object 60 in the first image 401 is greater than the second threshold, the calculating unit 10 filters the identity information 61 of the at least one other object 60 which is blocked by the large object 60. When the calculating unit 10 integrates the identity information 61 of the at least one object 60 with the first image 401, calculating unit 10 can avoid displaying too much identity information 61 of the at least one object 60 in the second image 402. In another embodiment, the water surface vehicle is a ferryboat, and the at least one object 60 is a ferryboat, too. The ferryboat is regarded as the large object 60. When the own ferryboat crosses the other ferryboats, the other ferryboats are getting closer to the own ferryboat. When the area ratio of the other ferryboats to the first image 401 is greater than the second threshold, the calculating unit 10 filters the identity information 61 of the other at least one object 60 which is blocked by the other ferryboats. The blocking filtering conditions of the embodiment include blocking by the terrain 70, the distance between the water surface vehicle and the at least one object 60 being greater than the first threshold, the area ratio of the at least one object 60 to the first image 401 being greater than the second threshold or the combination thereof.

The step (D) is the calculating unit 10 displaying the identity information 61 of at least one object 60 in the second image 402 and the calculating unit 10 adjusting the display position of the identity information 61 of each of the at least one object 60 via a position adjustment condition to obtain a third image 403. The step (D) includes the step (D1) and the step (D2). The step (D1) is the calculating unit 10 adjusting the display position of the identity information 61 of each of the at least one object 60 in the second image 402. The at least one object 60 is displayed as the icon in the third image 403. The first image 401, the second image 402 and the third image 403 of the present embodiment have an X coordinate in the direction X which is parallel to the image capture device 40 and an Y coordinate in the direction Y which is perpendicular to the image capture device 40. The calculating unit 10 defines the display position of the identity information 61 of each of at least one object 60 by the coordinate. The coordinate consists of X coordinate and Y coordinate.

Figure 6:
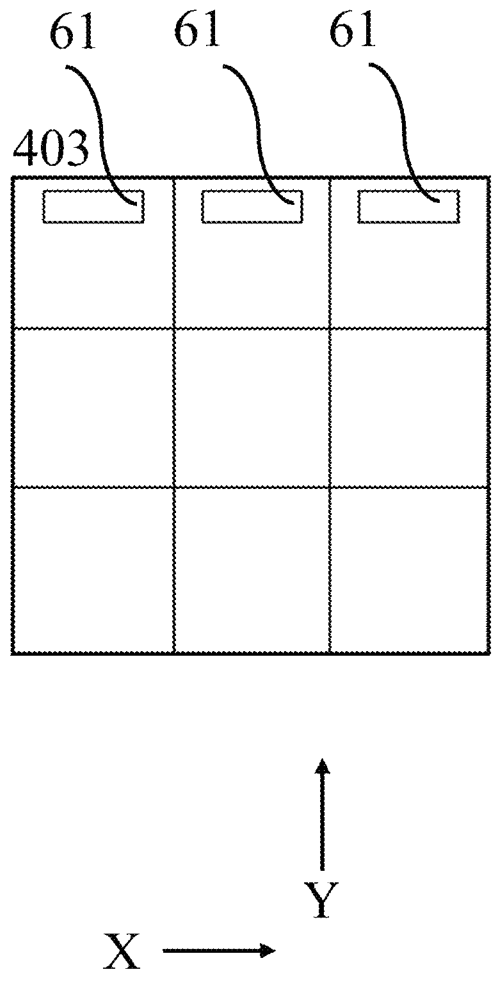
FIG. 6 shows a schematic diagram of the calculating unit displaying the identity information of the at least one object which is blocked by the terrain in the third image of the real-time vessel identity and image matching display method of the embodiment of the present invention.

Specifically, please refer to FIG. 6. The step (D1) includes step (D11). The step (D11) is the calculating unit 10 displaying the identity information 61 of each of the at least one object 60 which is blocked by the terrain 70 in the third image 403. In the present embodiment, the calculating unit 10 displays the identity information 61 of each of the at least one object 60 which is blocked by the terrain 70 at the top of the third image 403, but the calculating unit 10 does not display the icon of the at least one object 60. The step (D11) is executed based on the choice of the captain that is to provide the complete information to the captain.

Figure 7:
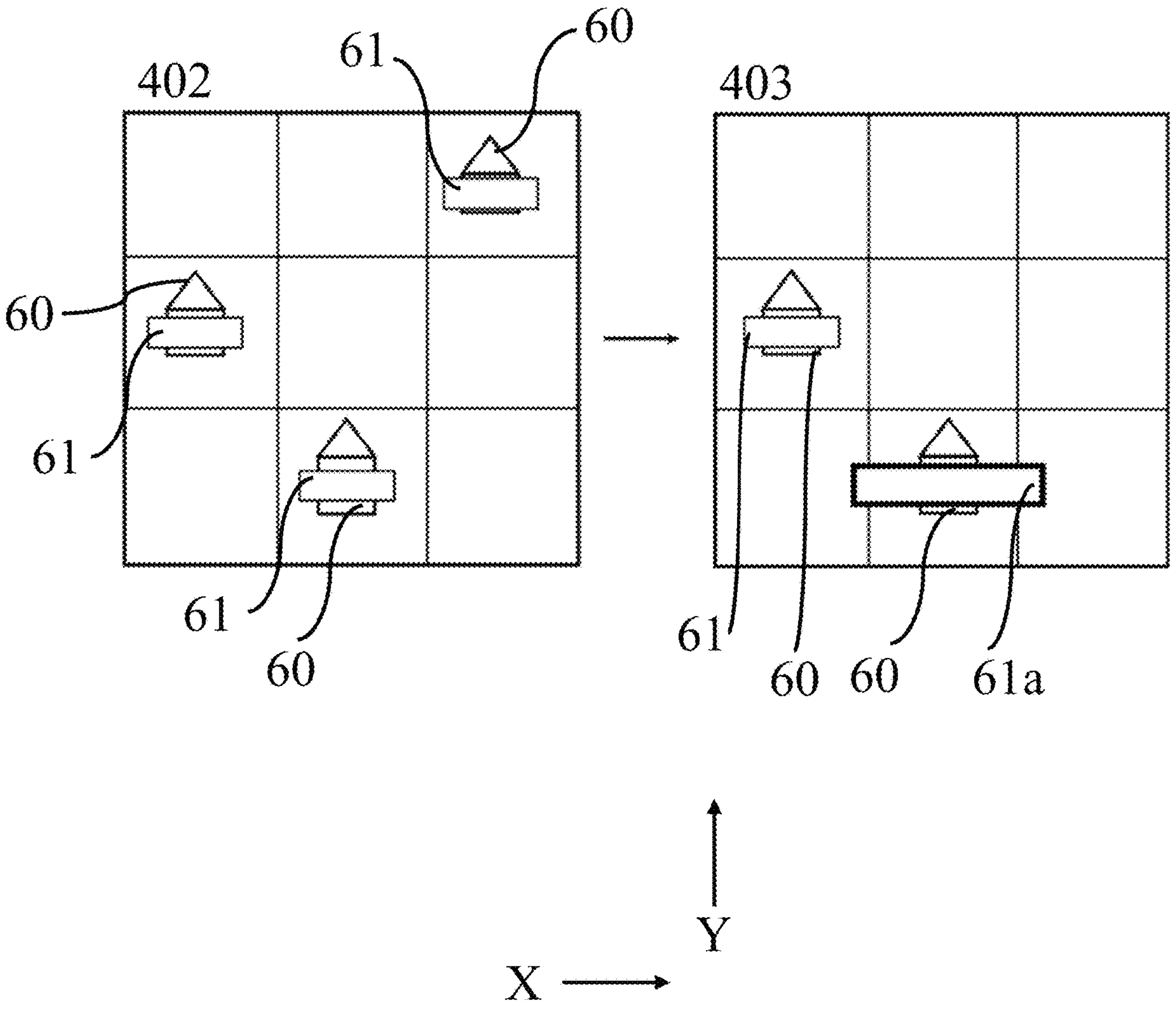
FIG. 7 shows a schematic diagram of the calculating unit displaying the identity information of the at least one object in a special mode when the risk level is greater than a third threshold of the real-time vessel identity and image matching display method of the embodiment of the present invention.

Moreover, please refer to FIG. 7. The step (D2) is the calculating unit 10 using the Global Position System (GPS) coordinate of the water surface vehicle, speed of the water surface vehicle, heading direction of the water surface vehicle, Time to the Closet Point of Approach (TCPA) between the water surface vehicle and the at least one object 60, Distance at the Closet Point of Approach (DCPA) between the water surface vehicle and the at least one object 60, and the identity information 61 of each of the at least one object 60 to calculate risk level of the water surface vehicle and the at least one object 60. The step (D3) is the calculating unit 10 displaying the identity information 61 of each of the at least one object 60 in a special mode when the risk level is greater than a third threshold. Please refer to right side of FIG. 7, the identity information 61*a* of the at least one object 60 is presented by a thick black frame line. The third threshold includes Time to the Closet Point of Approach (TCPA) between the water surface vehicle and the at least one object 60 which is less than 12 minutes, Distance at the Closet Point of Approach (DCPA) between the water surface vehicle and the at least one object 60 which is less than 1 nautical mile or the combination thereof. The special mode of the present embodiment is to display the identity information 61 of at least one object 60 with more information, such as the larger font size, conspicuous color or the combination thereof. The more information includes ship name of the at least one object 60, ship speed of the at least one object 60, heading direction of the at least one object 60, distance between the at least one object 60 and the water surface vehicle, Time to the Closet Point of Approach (TCPA) between the water surface vehicle and the at least one object 60, Distance at the Closet Point of Approach (DCPA) between the water surface vehicle and the at least one object 60, category of the at least one object 60, Maritime Mobile Service Identify (MMSI) of the at least one object 60 or the combination thereof. The conspicuous color is red or yellow. The captain of the water surface vehicle can concentrate and immediately focus on the at least one object 60 with the risk level which is greater than the third threshold to deal with potential threat and to increase navigation safety.

In another embodiment, the step (D3) includes the step (D31). The step (D31) is the calculating unit 10 filtering the identity information 61 of each of the at least one object 60 when the risk level being lower than a fourth threshold. The fourth threshold includes Time to the Closet Point of Approach (TCPA) between the water surface vehicle and the at least one object 60, and Time to the Closet Point of Approach (TCPA) between the water surface vehicle and the at least one object 60 which is greater than 30 minutes, Distance at the Closet Point of Approach (DCPA) between the water surface vehicle, and Distance at the Closet Point of Approach (DCPA) between the water surface vehicle which is greater than 3.5 nautical mile or the combination thereof.

Figure 8:
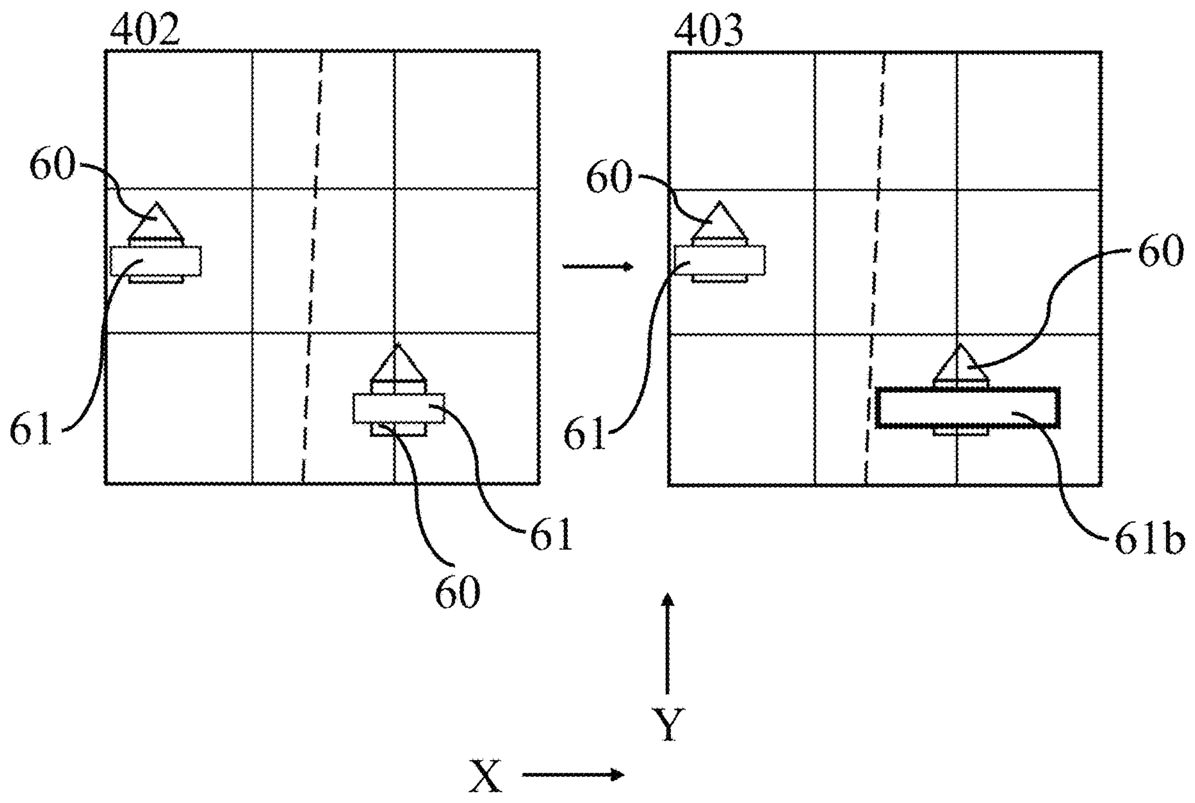
FIG. 8 shows a schematic diagram of the calculating unit displaying the identity information of the at least one object in a special mode when the risk level is greater than a fifth threshold of the real-time vessel identity and image matching display method of the embodiment of the present invention.

Please refer to FIG. 8. In another embodiment, the step (D3) includes the step (D32) and the step (D33). The step (D32) is the calculating unit 10 using the Global Position System (GPS) coordinate of a water surface vehicle, speed of the water surface vehicle, heading direction of the water surface vehicle, Time to the Closet Point of Approach (TCPA) between the water surface vehicle and the at least one object 60, Distance at the Closet Point of Approach (DCPA) between the water surface vehicle and the at least one object 60, and the identity information 61 of each of the at least one object 60 to calculate waterway coefficient of the water surface vehicle and the at least one object 60. In the present embodiment, the waterway coefficient is a probability of the water surface vehicle colliding with the at least one object 60 while the water surface vehicle is travelling on the predetermined navigation route. The dotted line is the predetermined navigation route of the water surface vehicle in FIG. 8. The step (D33) is the calculating unit 10 displaying the identity information 61 of each of the at least one object 60 in the special mode when collision is judged to be occurred via the water coefficient. The special mode of the present embodiment is displaying the identity information 61 of the at least one object 60 in the conspicuous color. Please refer to the identity information 61*b* of the at least one object 60 on the right side of FIG. 8 with a thick black frame line. Specifically, the step (D31) may be skipped, then the step (D32) and the step (D33) will be directly executed.

Figure 9:
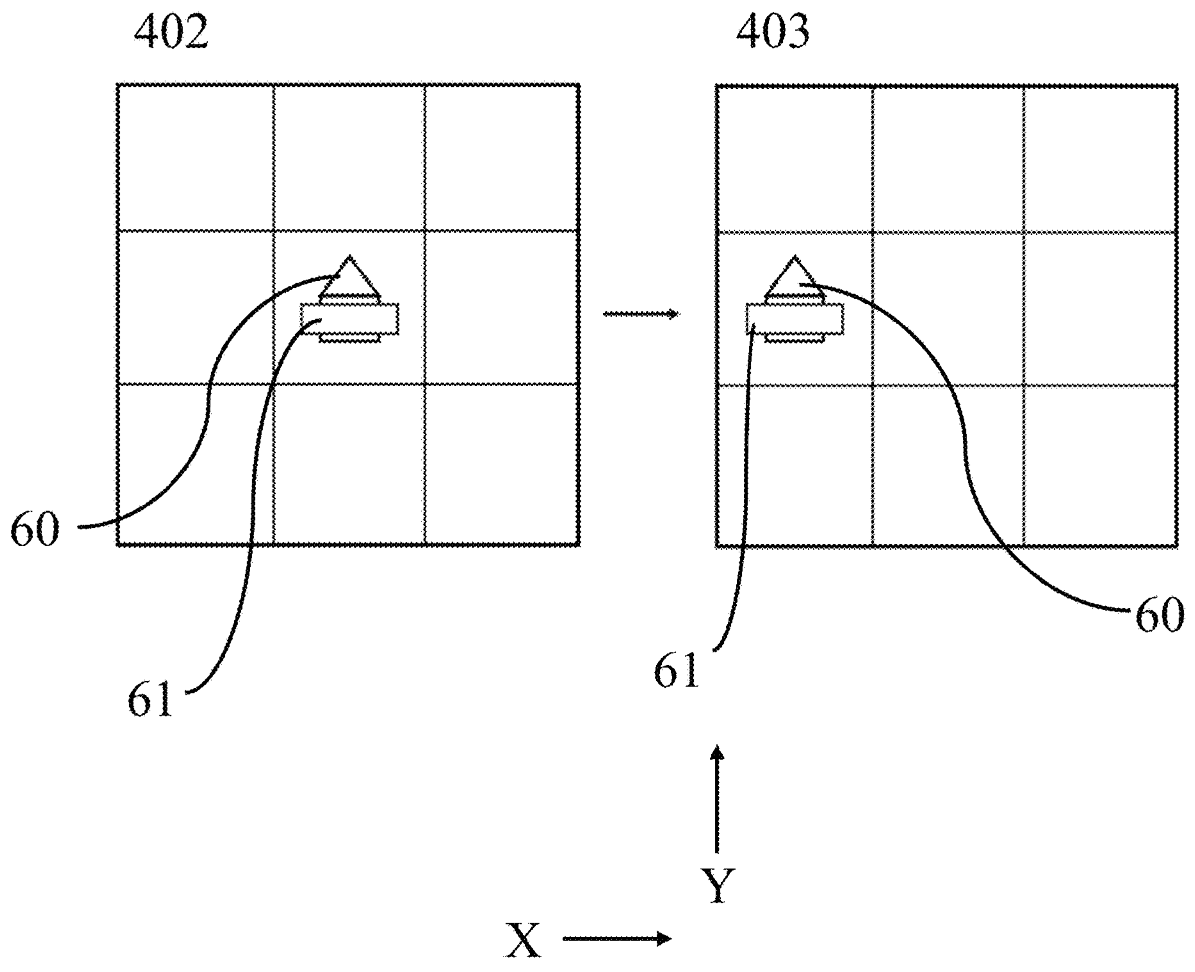
FIG. 9 shows a schematic diagram of the calculating unit to perform weighted adjustment on the display position of the identity information of the at least one object of the real-time vessel identity and image matching display method of the embodiment of the present invention.

Further, please refer to FIG. 9. The step (D4) is the calculating unit 10 using the Inertial Measurement Unit (IMU) data of the water surface vehicle to calculate the heading direction changing range of the water surface vehicle. The step (D5) is that when the heading changing range of the water surface vehicle is greater than a fifth threshold, the calculating unit 10 using heading direction of the water surface vehicle to calculate the sailing direction and predictable sailing direction of the water surface vehicle, performing weighted adjustment on the display position of the identity information 61 of each of the at least one object 60. The heading direction may be changed to the left or to the right. The fifth threshold is 5 degrees. When the bow of the water surface vehicle changes to the right by more than 5 degrees, causing the second image 402 to shake. The calculating unit 10 performs weighted adjustment on the display position of the identity information 61 of each of the at least one object 60, and thus the identity information 61 of each of the at least one object 60 is displayed on the icon with the corresponding the at least one object 60. The second image 402 and the third image 403 of the present embodiment have an X coordinate in the direction X which is parallel to the image capture device 40 and an Y coordinate in the direction Y which is perpendicular to the image capture device 40. The calculating unit 10 performs weighted adjustment on the X coordinate of the display position of the identity information 61 of each of the at least one object 60 which is according to the changing in the heading direction of the water surface vehicle. The changing range in the heading direction of water surface vehicle increases, the weighted adjustment of the X coordinate will increase, too. Specifically, the calculating unit 10 makes the display position of the identity information 61 of each of the at least one object 60 be displayed on the icon corresponding to the at least one object 60 via the weighted adjustment.

Figure 10:
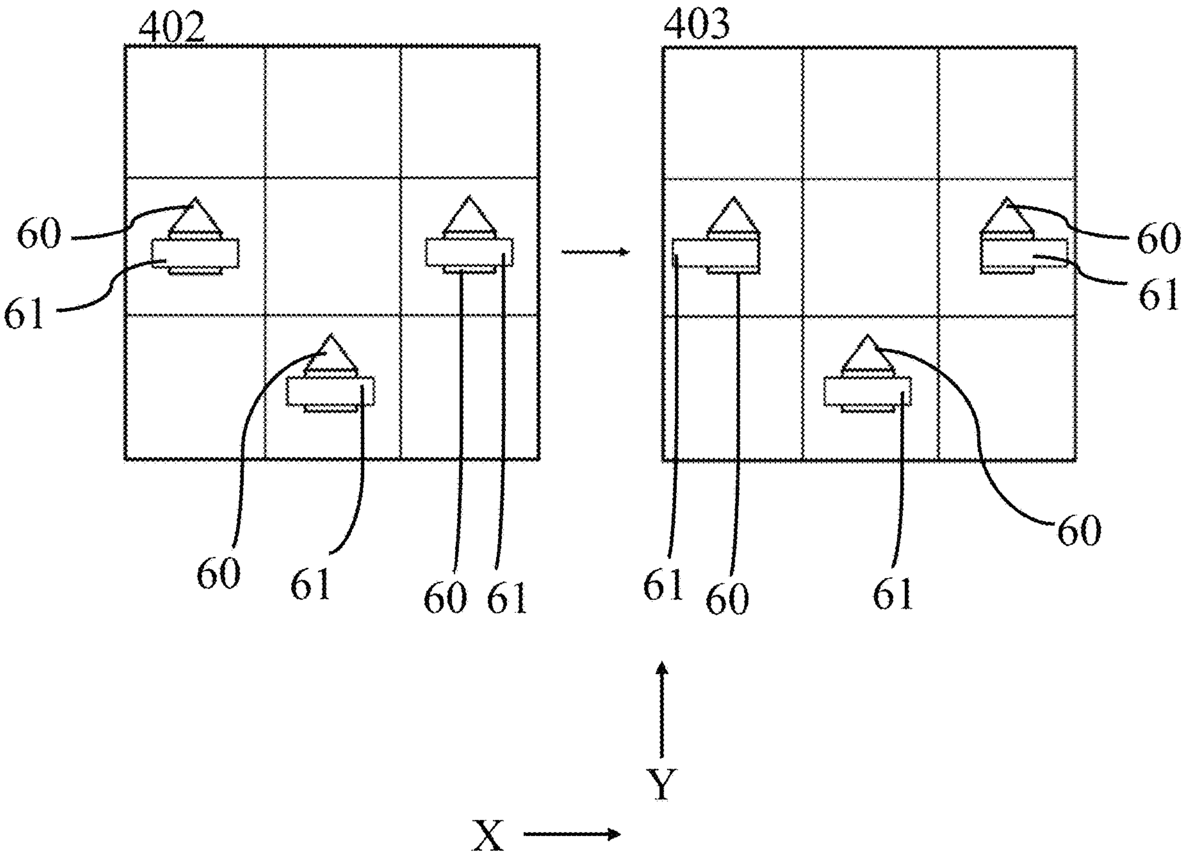
FIG. 10 shows a schematic diagram of the calculating unit to calculate optimal the display position of the identity information of the at least one object of the real-time vessel identity and image matching display method of the embodiment of the present invention.

Further, please refer to FIG. 10. The step (D6) is the calculating unit 10 using coordinate of the display position of the identity information 61 of each of the at least one object 60 to calculate optimal the display position of the identity information 61 of each of the at least one object 60. The optimization of the display position of the identity information 61 of each of the at least one object 60 in the present embodiment is defined as the calculating unit 10 automatically adjusting the font size, direction, icon display position of the at least one object 60 or the combination thereof. The display position of the identity information 61 of each of the at least one object 60 can completely display the identity information 61 of each of the at least one object 60. In the present embodiment, the distance between each of the identity information 61 of the at least one other object 60 is greater than 10 pixels, and thus to prevent the identity information 61 of the at least one object 60 and the identity information 61 of the at least one other object 60 from blocking or overlapping each of other. The position adjustment conditions of the present embodiment include risk level, heading changing range of the water surface vehicle, interval of the identity information 61 of each of the at least one object 60 or the combination thereof.

The step (E) is the calculating unit 10 sending the third image 403 to a display device 50. The step (F) is the display device 50 displaying the third image 403. The third image 403 is calculating unit 10 dynamically adjusting the identity information 61 of the at least one object 60 on the corresponding icon of the at least one object 60 in real-time.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A real-time vessel identity and image matching display method, comprising the following steps:

(A) providing a real-time vessel identity and image matching display system;
 wherein the real-time vessel identity and image matching display system comprises:
 a calculating unit;
 a nautical instrument, connecting to the calculating unit, the nautical instrument providing a nautical data;
 an Automatic Identification System, connecting to the calculating unit, the Automatic Identification System providing an identity information for each of at least one object;
 an image capture device, connecting to the calculating unit, the image capture device providing a first image; and
 a display device, connecting to the calculating unit;
(B) the calculating unit using the nautical data, each of the identity information and the first image to calculate and to obtain analysis data;
(C) the calculating unit filtering the analysis data via a block filtering condition to obtain a second image;
(D) the calculating unit displaying the identity information of the at least one object in the second image and adjusting the display position of the identity information of each of the at least one object via a position adjustment condition to obtain a third image;
(E) the calculating unit sending the third image to a display device; and
(F) the display device displaying the third image;
wherein the step (D) comprises:
(D1) the calculating unit adjusting the display position of the identity information of each of the at least one object in the second image;
(D2) the calculating unit using the Global Position System (GPS) coordinate of a water surface vehicle, speed of the water surface vehicle, heading direction of the water surface vehicle, Time to the Closet Point of Approach (TCPA) between the water surface vehicle and the at least one object, Distance at the Closet Point of Approach (DCPA) between the water surface vehicle and the at least one object, and the identity information of each of the at least one object to calculate risk level of the water surface vehicle and the at least one object;
(D3) the calculating unit displaying the identity information of each of the at least one object in a special mode when the risk level is greater than a third threshold;
(D4) the calculating unit using Inertial Measurement Unit (IMU) data of the water surface vehicle to calculate heading changing range of the water surface vehicle;
(D5) when the heading changing range of the water surface vehicle is greater than a fifth threshold, the calculating unit using heading direction of the water surface vehicle to calculate sailing direction and predictable sailing direction of the water surface vehicle, performing weighted adjustment on the display position of the identity information of each of the at least one object; and (D6) the calculating unit using coordinate of the display position of the identity information of each of the at least one object to calculate optimal the display position of the identity information of each of the at least one object.

2. The real-time vessel identity and image matching display method as claimed in claim 1, wherein the real-time vessel identity and image matching display system is configured on a water surface vehicle.

3. The real-time vessel identity and image matching display method as claimed in claim 1, wherein the calculating unit is Central Processing Unit (CPU), Graphic Processing Unit (GPU) or combination thereof.

4. The real-time vessel identity and image matching display method as claimed in claim 1, wherein the nautical instrument is nautical chart, compass, radar, Inertial Measurement Unit (IMU) or combination thereof.

5. The real-time vessel identity and image matching display method as claimed in claim 1, wherein the at least one object is water vehicle.

6. The real-time vessel identity and image matching display method as claimed in claim 1, wherein each of the identity information is ship name of the at least one object, ship speed of the at least one object, heading direction of the at least one object, Global Positioning System (GPS) coordinate of the at least one object, Maritime Mobile Service Identify (MMSI) of the at least one object or the combination thereof.

7. The real-time vessel identity and image matching display method as claimed in claim 1, wherein the image capture device is visible light camera or invisible light camera.

8. The real-time vessel identity and image matching display method as claimed in claim 1, wherein the display device is screen.

9. The real-time vessel identity and image matching display method as claimed in claim 1, wherein the step (C) comprises:

(C1) the calculating unit using the analysis data to perform image recognition, and the calculating unit identifying the at least one object which is blocked by terrain;

(C2) the calculating unit filtering the identity information of the at least one object which is blocked by the terrain;

(C3) the calculating unit using the analysis data to calculate a distance between a water surface vehicle and the at least one object;

(C4) the calculating unit filtering the identity information of the at least one object when the distance between the water surface vehicle and the at least one object is greater than a first threshold;

(C5) the calculating unit using the analysis data to calculate an area ratio of the at least one object to the first image; and (C6) the calculating unit filtering the identity information of the at least one object which is blocked when the area ratio is greater than a second threshold.

10. The real-time vessel identity and image matching display method as claimed in claim 9, wherein the terrain is nature terrain or human-made structure.

11. The real-time vessel identity and image matching display method as claimed in claim 9, wherein the first threshold for the water surface vehicle which is outside of port is 1 nautical mile.

12. The real-time vessel identity and image matching display method as claimed in claim 9, wherein the first threshold for the water surface vehicle which is inside of port is 0.5 nautical mile.

13. The real-time vessel identity and image matching display method as claimed in claim 9, wherein the second threshold is 75 percent.

14. The real-time vessel identity and image matching display method as claimed in claim 1, wherein the step (D1) comprises:

(D11) the calculating unit displaying the identity information of each of the at least one object which is blocked by the terrain in the third image.

15. The real-time vessel identity and image matching display method as claimed in claim 1, wherein the step (D3) comprises:

(D31) the calculating unit filtering the identity information of each of the at least one object when the risk level is lower than a fourth threshold.

16. The real-time vessel identity and image matching display method as claimed in claim 15, wherein the fourth threshold includes the Time to the Closet Point of Approach (TCPA) between the water surface vehicle and the at least one object which being greater than 30minutes, the Distance at the Closet Point of Approach (DCPA) between the water surface vehicle being greater than 3.5 nautical mile or combination thereof.

17. The real-time vessel identity and image matching display method as claimed in claim 1, wherein the step (D3) further comprises:

(D32) the calculating unit using the Global Position System (GPS) coordinate of the water surface vehicle, the speed of the water surface vehicle, the heading direction of the water surface vehicle, the Time to the Closet Point of Approach (TCPA) between the water surface vehicle and the at least one object, the Distance at the Closet Point of Approach (DCPA) between the water surface vehicle and the at least one object, and the identity information of each of the at least one object to calculate waterway coefficient of the water surface vehicle and the at least one object; and (D33) the calculating unit displaying the identity information of each of the at least one object in the special mode when collision is judged to be occurred via the waterway coefficient.

18. The real-time vessel identity and image matching display method as claimed in claim 1, wherein the third threshold includes the Time to the Closet Point of Approach (TCPA) between the water surface vehicle and the at least one object which being 12minutes, the Distance at the Closet Point of Approach (DCPA) between the water surface vehicle which being 1 nautical mile or combination thereof.

19. The real-time vessel identity and image matching display method as claimed in claim 1, wherein the fifth threshold is 5 degrees.

* * * * *